I. H. LEVIN.
ELECTROLYTIC GAS GENERATOR.
APPLICATION FILED DEC. 28, 1920.
1,434,548.
Patented Nov. 7, 1922.
2 SHEETS—SHEET 2.
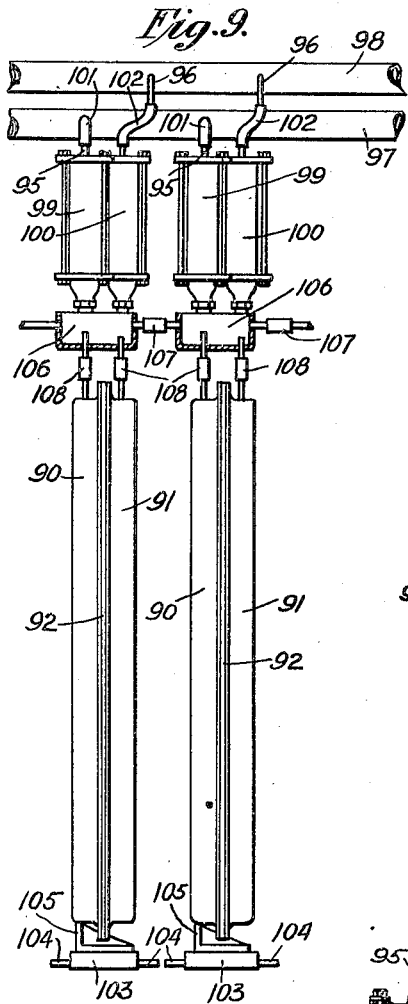
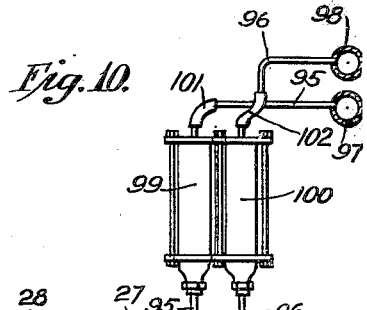
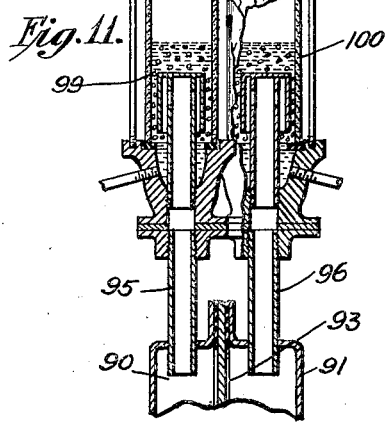
WITNESSES:
INVENTOR.
Isaac H. Levin
BY Ralph L. Flint
ATTORNEY Patented Nov. 7, 1922.

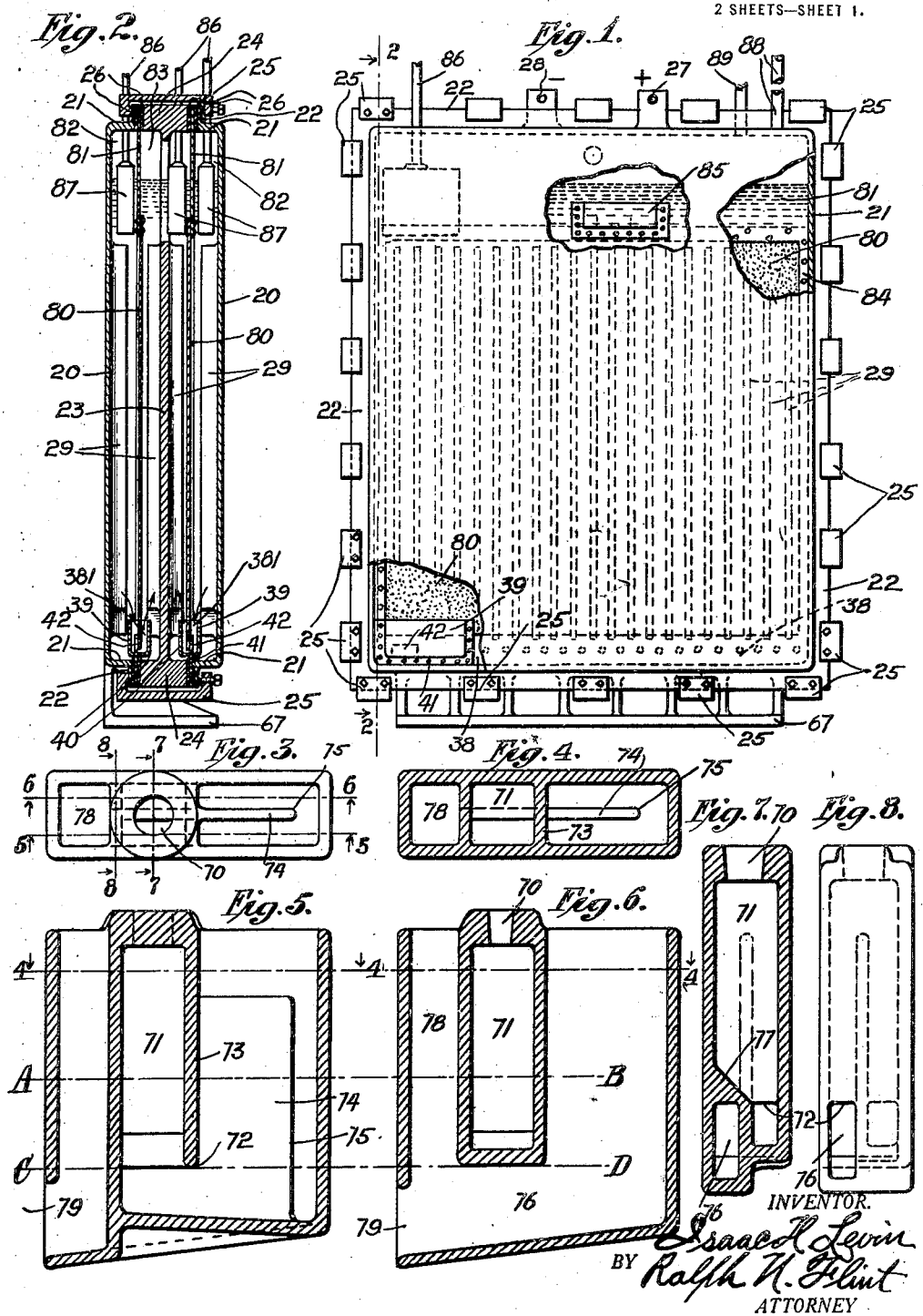

1,434,548

UNITED STATES PATENT OFFICE.

ISAAC H. LEVIN, OF NEW YORK, N. Y., ASSIGNOR TO ELECTROLYTIC OXY-HYDROGEN LABORATORIES, INC., OF NEW YORK, N. Y.

ELECTROLYTIC GAS GENERATOR.

Original application filed May 22, 1917, Serial No. 170,125. Divided and this application filed December 28, 1920. Serial No. 433,735.

*To all whom it may concern:*

Be it known that I, ISAAC H. LEVIN, a citizen of the United States, and a resident of the borough of Manhattan, in the city, county, and State of New York, have invented certain new and useful Improvements in Electrolytic Gas Generators, of which the following is a full, clear, concise and exact description, such as will enable others skilled in the art to which the invention relates to make and use the same, reference being made therein to the accompanying drawing, which forms a part of this specification, this present application being a division of my application for patent for electrolytic gas generators filed upon the 22nd day of May, 1917, Serial Number 170,125.

My invention relates to electrolytic gas generators designed to produce hydrogen and oxygen gases by subjecting water containing a small quantity of a suitable electrolyte such, for example, as potassium hydroxide, sulphuric acid, etc., to the action of a current of electricity which is caused to flow therethrough; the electrolyte being dissociated by the water, oxygen being liberated at the positive electrode or anode of the generator, and hydrogen at the negative electrode or cathode; all in accordance with the well known phenomena commonly referred to as the decomposition of water by means of a current of electricity.

My invention relates particularly to that type or class of electrolytic gas generators in which the liquid acted upon is contained in a suitable receptacle or casing made up of two or more parts or casing members electrically insulated from one another, and in which the casing members themselves form the electrodes from which the current passes into and through the liquid, the conductors through which current is supplied to the generator being connected directly to the casing members and said members being made of metal, so that the current may flow through them and into the liquid; as distinguished from electrolytic gas generators in which the electrodes are independent of and are insulated from the casing which contains the liquid acted upon.

The objects of my invention are to provide an electrolytic gas generator of the type or kind above referred to wherein an improved form and arrangement of casing members are employed, whereby lower electrical resistance and increased gas generating capacity are secured; to provide an improved electrolytic gas generator in which the casing is made up of a plurality of parts or sections secured together, whereby a generator of greater gas generating capacity than a generator having a casing made up of two parts or sections, and a generator of greatly reduced resistance, is secured; to provide an electrolytic gas generator in which the sections of the casing form the electrodes, and in which a porous diaphragm or diaphragms whereby the interior of the casing is divided into two or more compartments, is non-conducting in character, as distinguished from being made of metal as has heretofore been the case, to provide a plan and arrangement whereby one or more separate and distinct gas generating units of the type or class above referred to may be connected with and adapted to discharge into a single pair of offtake conduits; to provide an improved device for supplying liquid to the various compartments within the casing of electrolytic gas generators and which device serves also as a safety device in case the pressure within the compartment which it supplies becomes too great, and as an outlet for the gas produced within the compartment should the liquid in any particular compartment or in the casing as a whole become so low as to interfere with the proper operation of the generator; to provide improved means for supporting gas generating devices of the type herein referred to from the floor or support provided for them; and to otherwise improve upon and enhance the efficiency of electrolytic gas generating devices of the general type or kind to which my invention relates.

With the above enumerated and other objects of invention in view my invention consists in the improved electrolytic gas generator and component elements, parts, and features thereof illustrated in the accompanying drawings and hereinafter described and particularly claimed, and in such variations and modifications thereof as will be obvious to those skilled in the art to which my invention relates.

In the drawings accompanying and forming a part of this specification and wherein the preferred embodiment of my invention is illustrated:

Figure 1 is a view illustrating one form of my improved electrolytic gas generator. mainly in side elevation, but broken away in places to show features of internal elements of the device;

Figure 2 is a view illustrating my improved generator in section and upon a vertically extending transverse plane indicated by the line 2, 2, Figure 1;

Figure 3 is a plan view showing an improved water supply, gas outlet, and safety device employed for supplying water to the various compartments within the casing of my gas generating device, upon a considerably enlarged scale;

Figure 4 is a view showing a section of the said water supply device upon a horizontal plane indicated by the line 4, 4, Figures 5 and 6;

Figures 5 and 6 are views showing sections of the water supply device upon longitudinally extending vertical planes indicated by the lines 5, 5 and 6, 6, Figure 3;

Figures 7 and 8 are views showing sections of the said device upon transversely extending vertical planes indicated by the lines 7, 7 and 8, 8, Figure 3;

Figure 9 is a view showing two gas generating units of a form differing from the forms shown in the other views, in end elevation, and as adapted to discharge into a single pair of gas offtake conduits or mains;

Figure 10 is a view illustrating one of the gas generating elements shown in Figure 9 in side elevation, and broken away to show features of interior construction; and, Figure 11 is a fragmentary view illustrating certain indicating devices ordinarily employed in all forms of my generator, and through which the gases produced flow, although the said devices are omitted in the form of my device shown in Figures 1 and 2.

Referring first to Figures 1 and 2, the casing of the generator illustrated therein is made up of three parts or sections secured together but insulated from one another, the end section members being alike in form and the single intermediate section being functionally the equivalent of two end sections; so that the capacity of a generator having a three part casing is substantially the same as that of two generators the casings of which are in two parts (as illustrated in Figures 9 and 10), while the cost, weight, and space occupied by a single three section generator are materially less than would be the case if two generators each made up of two casing sections were employed. The end section members each comprise an end wall 20 of large area, and a peripheral wall 21 of comparatively slight length or height measured away from the end wall, and which peripheral or side wall terminates in a flange 22; while the intermediate section comprises a central web or wall 23 corresponding in area and function with the end walls 20, and a peripheral wall 24 extending upon each side of said central wall a distance corresponding approximately with the height of the peripheral walls 21 of the end section members. The three casing members are preferably connected together as shown by means of a plurality of clamping members 25 sufficiently numerous to prevent leakage from the casing; although they may obviously be secured together by means of bolts if deemed necessary or desirable. Suitable packing strips 26 made of insulating material are interposed between the meeting edges of the casing members whereby tight joints are secured and the casing members are insulated from one another, and suitable conductors are to be connected with terminals 27, 28 through which the generator may be supplied with current; the casing members being made of metal, preferably iron, so that they serve as electrodes, and the terminals of the outer sections being both connected with one conductor and that of the inner with the other, so that the outer sections are both of one polarity and the inner of the other, as indicated and as will be understood.

The construction above described provides section members which may properly be referred to as recessed, and the casing formed by securing them together will have two internal liquid containing compartments of large area, but of comparatively slight depth as measured from the wall 20 toward the wall 23, so that the resistance of the generator will be small, and, in order to provide a greater area of contact between the casing members and the liquid within the casing and to further reduce the resistance of the generator the inner surfaces of the end walls 20, and both sides of the web or wall 23 (which is in effect an end wall for both the liquid compartments), are provided with ribs 29 extending toward one another and into the liquid compartments, as shown.

Located within the liquid containing compartments and serving to divide the same into substantially equal parts are porous diaphragms 80 made preferably of asbestos and the purpose of which is to prevent the gases produced from mingling as they pass upward through the liquid, the said diaphragms in effect dividing each liquid compartment into the chambers one of which when the generator is in operation contains bubbles of oxygen gas passing upwards through the liquid, while bubbles of hydrogen gas pass upward through the liquid in the other chamber. The porous diaphragms 80 are secured to and carried by frame members having upper portions 81 which form non-pervious partitions and divide the upper end of the interior of the casing so as to provide two gas chambers 82 in which gas of one kind accumulates, and a third gas chamber 83 in which gas of the other kind accumulates; said frame members having oppositely located depending side portions, one of which is shown at 84, and a bottom bar or strip 38 shown in dotted lines in Figure 1; thus providing an opening in the frame along and around the edge of which the periphery of the diaphragm is secured. The bottom bar 38 carries means for establishing a passage from one chamber to another comprising two recessed channels or open sided cups 39, 40 each having a flange 41 extending along the bottom and up the sides thereof and through which flanges, bottom bar, and diaphragm screws or rivets extend, whereby the channels are held in place and supported by the bottom bar. A hole 42 is located at the bottom of the channels and extends through the bottom bar 38 and diaphragm; and the purpose of the elements here referred to is to establish a passage 381 from one side of the diaphragm to the other through which liquid may flow to equalize the pressure and level of the liquid upon the two sides of the diaphragm, while at the same time preventing the passage of bubbles of gas from one side thereof to the other. A like device shown at 85 in Figure 1 only is provided to permit a flow of liquid from one chamber to the other at the upper end of the casing, which device need not, it is believed, be described in detail.

Liquid is supplied to the liquid compartments provided by the diaphragms through conduits 86, and safety devices 87 shown in Figures 3 to 8 and hereinafter described at length; and the gases flow from the gas chambers through outlet conduits 88 for one kind of gas, and 89 for the other, in which conduits suitable indicating devices or lanterns to be hereinafter described will be included, as will be appreciated. The entire generator is supported by a foot or bracket 67 carried by one only of the casing members, the same being either formed integrally with a casing section or separate therefrom and secured thereto; and said supporting means will be as long as may be deemed necessary to support the generator, and may be provided with strengthening ribs as shown, or may be in the form of two or more supports spaced apart from one another and all carried by one and the same casing member, all according to the exigencies of the case and the choice of the maker or user of my gas generating device. This construction of support prevents the sections of the generator from becoming short circuited through the base or support, as is liable to happen with the use of a support insulated from but which affords support to casing members of opposite polarity, and provides a construction in which the support need not be insulated from the generator casing, as will be appreciated.

The frame members above referred to may be made of any suitable material and are packed and insulated from the casing members by means of packing strips 26, as shown; and the pervious or porous diaphragms carried by said frame members are made from a non-metallic insulating material in order that they may under no circumstances become in effect electrodes. This is of importance in generators in which the casing members serve also as electrodes, for the reason that in such a generator if the electromotive force between any two sections separated by a diaphragm becomes greater than about 3.5 volts (this being about twice the voltage necessary to accomplish the decomposition of water as will be appreciated), then if a metallic diaphragm is used the fall of potential between it and each adjacent casing member will be sufficient to decompose water, and both hydrogen and oxygen may be produced in the generating chambers upon each side of the diaphragm in question. No such action is possible, however, if the diaphragm is non-metallic and is a non-conductor of electricity, as will be appreciated, for the said diaphragm can under no circumstances become and act as an electrode.

Liquid is supplied to the liquid containing compartments within the generator casing through liquid supply conduits 86 and filling devices 87, one for each casing section, each of which filling devices provides a tortuous passage communicating with the liquid compartment and also with the gas chamber of the section with which it is associated. These devices are so designed as to act as safety devices in case the gas pressure becomes too great within the gas chambers, and also as vents for permitting a free flow of gas from the chambers in case the level of the liquid in the casing becomes too low; the structural features of the said filling devices and their operation being as follows; the same reference numerals being used to designate like parts of them and the description being in the singular, as they are alike in structure and operation. The liquid supply conduits 86 may lead each from a separate filling cup, in which case the liquid supply device or means for each internal compartment of the generator casing is entirely separate and independent from the liquid supply device for the other compartment or compartments; or, the said supply conduits may all lead from a single supply trough or receptacle, as shown in Figure 9, in which case liquid is supplied simultaneously to all the compartments of the casing, as will be appreciated.

Referring now to Figures 3 to 8 which illustrate one of the liquid feed devices 87 in detail, the liquid is supplied through a suitable conduit 86 connected with the opening 70, and flows downward through a passage 71 and beneath the lower end 72 of a partition 73; then to the right, Figure 5, in front of a partition 74, and backward past the end 75 thereof; then to the left, Figure 6, back of said partition and through a passage 76 cut off from the passage 71 by a wall 77, Figure 7; then past the lower end of a vertically extending passage 78 and through an opening 79 into the liquid chamber; the upper end of the passage 78 and the space above the partition 74 being in open communication with the gas space above the liquid in the compartment supplied by the device.

The normal water level is indicated by the line A B, and, as liquid carrying bubbles of gas is forced backward through the passage above traced due to slight variations of gas pressure the gas will separate therefrom and pass into the gas chamber through the openings at the upper end of the passage 78 and above the partition 74; while if the gas pressure becomes too great for a longer time liquid will be forced back through said passage until the excess pressure is relieved. On the other hand if the level of the liquid falls below the level indicated by the line C D either as the result of back flow due to too great gas pressure, or because of a failure to supply liquid to the generator when needed, then the gas will pass through the open top of the chamber above the partition 74, beneath the lower end 72 of the partition 73, and up the passage 71 to the atmosphere; there being no liquid in the device to seal the lower end of the passage 71 when the level of liquid falls below the lower end 72 of the partition 73, as will be appreciated.

Figures 9 to 11 illustrate a form of my invention in which the casing of the generator is made up of two casing members or sections 90, 91 secured together and having a frame member 92 held in place between the meeting edges of the casing members, and the upper end 93 of which forms a partition as hereinbefore explained in describing the form of my invention illustrated in Figures 1 and 2; and 94 designates a porous diaphragm carried by said partition and dividing the interior of the casing into two compartments the upper ends of which are gas chambers, as will be appreciated.

The gases produced flow from the gas chambers through outlet conduits 95, 96 and into gas mains 97, 98; said conduits including suitable indicating devices or lanterns 99, 100 comprising glass cylinders held between suitable heads and containing water through which the gas passes in the form of bubbles, as indicated in Figure 11, thereby providing a visible indication as to whether or not the gases are flowing properly from the generator, said devices being similar in construction and operation to the equivalent devices illustrated and described in my patent for electrolytic gas generator No. 1,219,966 dated March 20th, 1917.

The indicating devices above referred to a are insulating in character, and additional insulating means in the form of sections 101, 102 of non-conductor tubing are preferably included in said gas outlet conduits in order to more completely insulate the casing sections from the metallic gas offtake mains; it being extremely important in gas generators wherein the casing members form electrodes that the said members be insulated from one another as completely as possible, as otherwise the casing members will be short circuited through the offtake gas conduits and mains, or a serious loss of current will occur if the insulation provided in said conduits is defective in any appreciable extent.

Figure 9 shows a plurality of gas generating units all insulated from and discharging into a single pair of gas offtake mains, the separate units being supported by insulating members or blocks 103 having projections 104 which prevent the generating units which they support from being placed too near one another; the separate units being supported by and through brackets 105 carried by one only of the sections thereof, as hereinbefore explained. In the arrangement here referred to the filling receptacles 106 for supplying liquid to the separate units are of the type disclosed in my patent above referred to; and they are shown as connected with one another through conduits having insulating sections 107, and with the casing sections through conduits having insulating sections 108, in order to prevent leakage of current through the liquid supply means, as will be appreciated.

The packing or rather combined packing and insulating strips employed between the meeting edges of the casing members and elsewhere about my generator, and which have been usually referred to simply as packing members or strips, are made from a special packing and insulating material which I have found to be especially effective in and particularly well adapted for use wherever such a material is used in electrolytic gas generating devices; the said material being composed of a plurality of layers or thin asbestos felt, each coated with rubber or equivalent material, and all the layers being pressed together and preferably vulcanized to a greater or less extent by the incorporation of sulphur with the rubber, whereby an insulating and packing strip made up of layers of asbestos and rubber vulcanized to a greater or less degree is secured.

Having described the invention, what I claim as new and desire to have protected by Letters Patent, is:—

1. In an electrolytic gas generator, a casing comprising three recessed casing members insulated from one another and secured together whereby two internal liquid containing compartments are provided, and which casing members form electrodes for the generator; two frame members held in place one between the meeting edges of each two adjacent casing members, and the upper ends of which form partitions whereby three gas chambers are provided within said casing; two porous diaphragms formed from non-metallic material located within said casing and carried one by each of said frame members; means for supplying liquid to the interior of said casing; and a gas outlet conduit leading from each of said gas chambers.

2. In an electrolytic gas generator, a casing comprising three recessed casing members insulated from one another and secured together whereby two internal liquid containing compartments are provided, and which casing members form electrodes for the generator; two porous diaphragms located within said casing and serving to divide the same into a plurality of gas generating chambers; two frame members to which said diaphragms are secured and whereby they are supported; means for supplying liquid to the interior of said casing; and means for conducting the gases produced from the interior of said casing.

3. In an electrolytic gas generator, a casing comprising three casing members insulated from one another and secured together, and so shaped as to provide a plurality of internal gas generating chambers, the two outer of said casing members forming electrodes of like polarity for the generator, and the middle one of said casing members forming an electrode of opposite polarity; two porous diaphragms located within said casing and serving to separate said gas generating chambers from one another; two frame members to which said diaphragms are secured and whereby they are supported; a plurality of liquid supply devices separate and independent from one another, and through which liquid is supplied to the interior of said casing; and means for conducting the gases produced from the interior of said casing.

4. In an electrolytic gas generator, a casing comprising three casing members insulated from one another and secured together whereby two internal liquid containing compartments are provided, the two outer of said casing members forming electrodes of like polarity for the generator, and the middle one of said casing members forming an electrode of opposite polarity; two porous diaphragms located one in each of said compartments and serving to divide said compartments each into two gas generating chambers; two frame members to which said diaphragms are secured and whereby they are supported; three liquid supply devices separate and independent from one another and associated one with each of said casing members, and through which liquid is supplied to said gas generating chambers; and means for conducting the gases produced from the interior of said casing.

5. In an electrolytic gas generator, a casing comprising three casing members insulated from one another and secured together, and so shaped as to provide a plurality of internal gas generating chambers, the two outer of said casing members forming electrodes of like polarity for the generator, and the middle one of said casing members forming an electrode of opposite polarity; two porous diaphragms made of non-conducting or insulating material located within said casing and serving to separate said chambers from one another; means for supplying liquid to the interior of said casing; and means for conducting the gases produced from the interior of said casing.

6. In an electrolytic gas generator, a casing comprising three casing members insulated from one another and secured together, and so shaped as to provide a plurality of internal gas generating chambers, the two outer of said casing members forming electrodes of like polarity for the generator, and the middle one of said casing members forming an electrode of opposite polarity; two porous diaphragms made of insulating or non-conducting material located within said casing and serving to separate said gas generating chambers from one another; two frame members held in place between the meeting edges of adjacent casing members and to which said diaphragms are secured; means for supplying liquid to the interior of said casing.

7. In an electrolytic gas generator, a casing comprising a plurality of casing members insulated from one another and secured together, and which casing members form electrodes for the generator and are so shaped as to provide an internal liquid containing compartment; a frame member held in place between adjacent casing members; a porous diaphragm made of insulating or non-conducting material carried by said frame member and serving to divide said compartment into two gas generating chambers; a liquid supply device adapted to supply liquid to each of said gas generating chambers, and which liquid supply device is provided with means for preventing a flow of gas from one of said gas generating chambers to the other; and gas outlet conduits leading from said casing.

In witness whereof I have hereunto affixed my signature, in the presence of two subscribing witnesses, this 23d day of December, 1920.

ISAAC H. LEVIN.

Witnesses:
CHARLES O. DEVERTS,
ADA GOLLNER.